United States Patent
Schön et al.

(10) Patent No.: US 12,152,686 B2
(45) Date of Patent: Nov. 26, 2024

(54) MOUNTING OF VACUUM VALVE PLATE

(71) Applicant: VAT Holding AG, Haag (CH)

(72) Inventors: Mathias Schön, Salez (CH); Bernhard Litscher, Buchs SG (CH); Mario Moser, Meiningen (AT); Alen Franic, Feldkirch (AT); Gregor Beck, Schaan (LI)

(73) Assignee: VAT Holding AG, Haag (CH)

( * ) Notice: Subject to any disclaimer, the term of this patent is extended or adjusted under 35 U.S.C. 154(b) by 66 days.

(21) Appl. No.: 17/987,975

(22) Filed: Nov. 16, 2022

(65) Prior Publication Data

US 2023/0151892 A1    May 18, 2023

(30) Foreign Application Priority Data

Nov. 16, 2021   (DE) .......................... 102021129884.9

(51) Int. Cl.
*F16K 3/314*    (2006.01)
*F16K 51/02*    (2006.01)

(52) U.S. Cl.
CPC .............. *F16K 3/314* (2013.01); *F16K 51/02* (2013.01)

(58) Field of Classification Search
CPC ............. F16K 3/314; F16K 3/18; F16K 51/02
See application file for complete search history.

(56) References Cited

U.S. PATENT DOCUMENTS

| | | | |
|---|---|---|---|
| 6,056,266 A * | 5/2000 | Blecha | F16K 3/0218 251/193 |
| 8,827,241 B2 | 9/2014 | Geiser et al. | |
| 10,520,109 B2 | 12/2019 | Hofer et al. | |
| 10,876,637 B2 | 12/2020 | Blecha et al. | |
| 2007/0272888 A1* | 11/2007 | Tichy | F16K 3/18 251/63 |
| 2011/0108750 A1 | 5/2011 | Ehrne et al. | |
| 2017/0204647 A1* | 7/2017 | Ehrne | E05F 15/57 |
| 2018/0058591 A1 | 3/2018 | Bohm et al. | |
| 2018/0156340 A1 | 6/2018 | Kim et al. | |
| 2020/0400238 A1 | 12/2020 | Shimoda et al. | |

FOREIGN PATENT DOCUMENTS

JP              202171186          5/2021

* cited by examiner

*Primary Examiner* — Daphne M Barry
(74) *Attorney, Agent, or Firm* — Volpe Koenig

(57) ABSTRACT

A valve plate has a plate portion with a front side elastomeric seal fitted thereon, and a connection apparatus arranged at the rear side for connecting the valve plate to a carrier apparatus of a vacuum valve. The connection apparatus includes first and second elongate connection portions, the first connection portion is located at one side and the second connection portion is located at the other side of the longitudinal center of the plate portion, with each being connected to the plate portion with the two spaced-apart ends thereof. The connection portions are spaced apart from the plate portion in the region between the two ends thereof, with a respective slot formed between the plate portion and the respective connection portion, and have in a central region of the longitudinal extent thereof a connection structure for connection to an end portion of a respective valve rod of the carrier apparatus.

12 Claims, 4 Drawing Sheets

MOUNTING OF VACUUM VALVE PLATE

INCORPORATION BY REFERENCE

The following documents are incorporated herein by reference as if fully set forth: German Patent Application No. 10 2021 129 884.9, Nov. 16, 2021.

TECHNICAL FIELD

The invention relates to a valve plate having a plate portion to which at a front side a seal made of an elastomer material is fitted and which has in a longitudinal direction a longitudinal extent which is greater than a width extent in a width direction which is located at right-angles relative to the longitudinal direction, and having a connection apparatus which is arranged at the rear side of the plate portion opposite the front side for connecting the valve plate to a carrier apparatus of a vacuum valve.

BACKGROUND

There are known valve plates which, acting as a connection apparatus for connecting to a carrier apparatus formed by a valve rod of a vacuum valve have a joint so that a degree of pivotability of the valve plate about an axis which is located at right-angles with respect to the valve rod is enabled. In the closed state of the vacuum valve, it is thereby possible to achieve a more uniform pressing of the seal which is arranged on the front side of the valve plate by structural tolerances and resilient deformations, in particular a slight bending of the valve rod in the closed state of the vacuum valve, being able to be compensated for. However, articulated connections in the vacuum region of the vacuum valve are undesirable as a result of particle production with surfaces which move against each other.

A valve plate of the type mentioned in the introduction is derived from US 2011/0108750 A1. At the rear side of a plate portion of the valve plate which has at the front side the seal made of the elastomer material there is arranged as a connection apparatus an elongate connection portion which is connected to the plate portion at the two ends thereof. Between the two ends, the connection portion is spaced apart from the plate portion and at the longitudinal center of the connection portion a connection structure for connecting the connection portion to an end portion of the valve rod is located, wherein an end portion of the valve rod is inserted into a recess of the connection portion and is screwed therein. A degree of pivoting of the valve plate relative to the valve rod is enabled by means of a resilient deformation of the connection portion in the form of twisting (=torsion) of the connection portion.

SUMMARY

An object of the invention is to provide an advantageous valve plate of the type mentioned in the introduction in which a uniform pressing of the resilient seal in the closed state of the vacuum valve is enabled. This is achieved with a valve plate having one or more of the features according to the invention.

A valve plate according to the invention has first and second elongate connection portions of which the first connection portion is located at one side of the longitudinal center and the second connection portion is located at the other side of the longitudinal center of the plate portion. At the ends thereof which are spaced apart in the longitudinal direction, the connection portions are each connected to the rear side of the plate portion. In the region between the two ends thereof, the connection portions are each spaced apart from the plate portion so that a respective slot is formed between the plate portion and the respective connection portion. In a central region of the longitudinal extent thereof, the connection portions each have a connection structure for connection to a respective valve rod of the carrier apparatus of the vacuum valve.

As a result of a bending of the connection portions in the context of twisting (=torsion), the angular position of the valve plate can be adapted to the precise position of the sealing face. This (slight) tilting of the valve plate is carried out in this instance about an axis which is located at right-angles to the valve rods. As a result of the construction of the connection apparatus according to the invention with first and second connection portions, in this instance a bending of the valve plate with respect to an axis which is located at right-angles relative to the valve rods can be reduced. The uniformity of the pressing of the longitudinal members of the seal which extend in the longitudinal direction of the valve plate over the length of these longitudinal members can in this instance be improved. Differences of the pressing of the narrow-side members which extend in the width direction of the seal in comparison with the pressing of the longitudinal members of the seal can thereby also be decreased.

In an advantageous embodiment of the invention, a respective connection portion has first and second plate-like connection arms which extend from the respective end of the connection portion as far as a central region of the longitudinal extent of the connection portion.

Preferably, these plate-like connection arms are located in this instance in planes which enclose with the front side, which is located in a plane, of the plate portion of the valve plate an angle of less than 20°, wherein these planes starting from the respective end of the connection portion move away from the front side of the plate portion in the direction toward the longitudinal center of the connection portion.

The plate-like connection arms may be connected to each other in a central region of the longitudinal extent of the respective connection arm via a thickened portion in which the connection structure is formed.

In an advantageous embodiment of the invention, there is provision for the connection structure to be formed in the region of a first narrow side of the respective connection portion and for the respective connection portion to be reinforced in a region of the extent thereof in the width direction, which region adjoins the opposing second narrow side of the respective connection portion, with respect to a region of the extent thereof in the width direction, which region adjoins the first narrow side, preferably by means of a reinforcement web which protrudes in the direction toward the plate portion of the valve plate.

BRIEF DESCRIPTION OF THE DRAWINGS

Other advantages and details of the invention will be explained below with reference to the appended drawings, in which.

DETAILED DESCRIPTION

Figure 1:
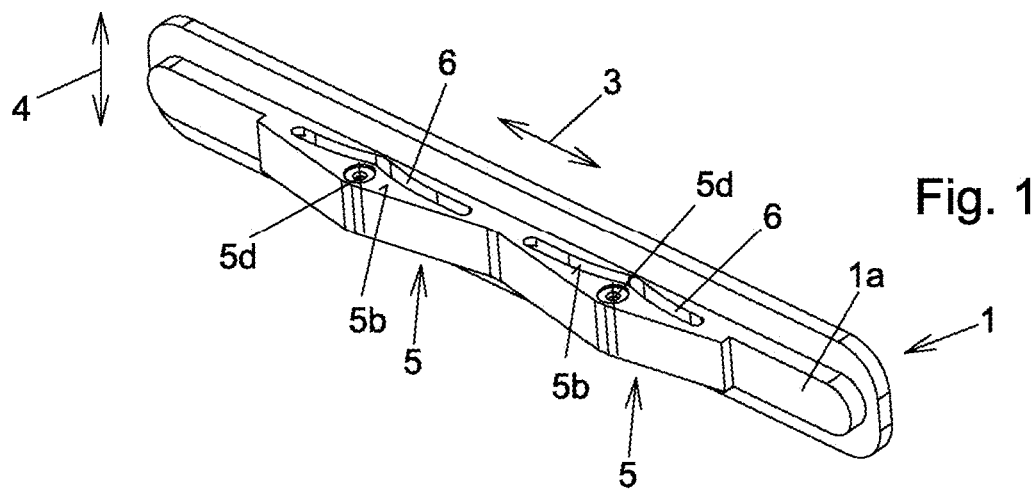
FIGS. 1 and 2 show oblique views of an embodiment of a valve plate according to the invention from different viewing directions.
Figure 2:
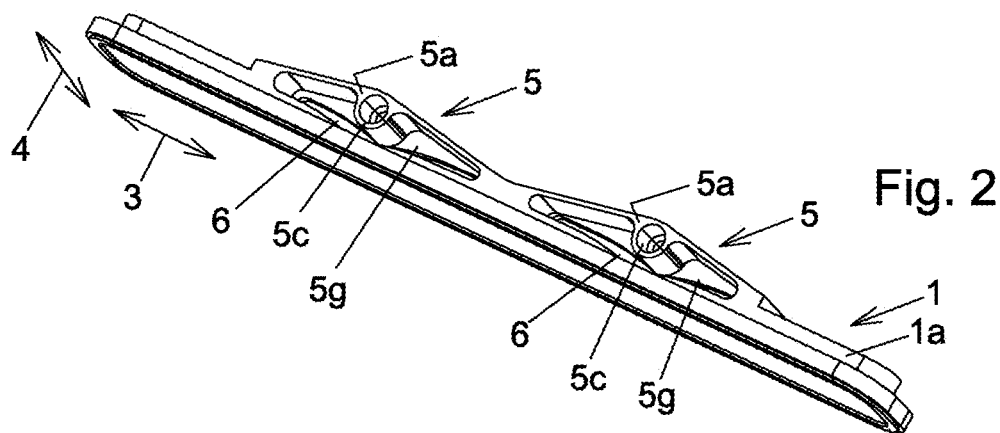
Figure 3:
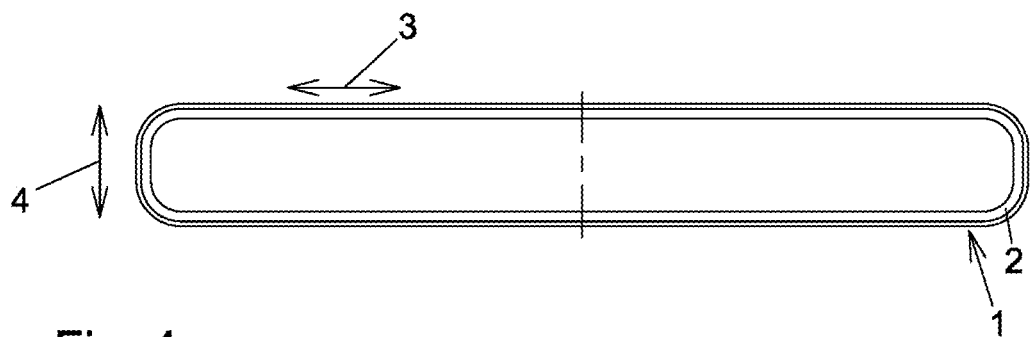
FIGS. 3 and 4 show a front and rear view.

An embodiment of a valve plate according to the invention is illustrated in FIGS. 1 to 8. The valve plate has a plate portion 1, to whose front side 18 which is preferably constructed at least substantially in a planar manner, an annular seal 2 made of an elastomer material is fitted. For example, the seal 2 may be vulcanized on the plate portion 1. An O-ring which is received in a groove may also be provided.

The plate portion 1 has a length a which is greater than the width b, preferably more than twice as large. The plate portion 1 consequently has a longitudinal extent in a longitudinal direction 3 which is greater than a width extent in a width direction 4 which extends at right-angles with respect to the longitudinal direction, preferably more than twice as large.

The thickness of the plate portion 1 is significantly smaller than the width b, preferably less than half as large.

When viewed as a plan view of the front side 18 of the plate portion 1, the plate portion has in the embodiment a rectangular contour with rounded corners, as is preferred.

In order to connect the valve plate to a valve rod, a connection apparatus which has first and second elongate connection portions 5 is used. The connection portions 5 thus have a greater extent in the longitudinal direction 3 than in the width direction 4. Preferably, the longitudinal extent of the connection portions 5 is more than twice as large as the width extent.

The two connection portions 5 are located at both sides of the longitudinal center 20 (=center of the extent in the longitudinal direction 3) of the plate portion 1. Preferably, the connection portions 5 are arranged symmetrically relative to the longitudinal center 20 of the plate portion 1 and are located with the longitudinal extents thereof parallel with each other, wherein they extend parallel with the longitudinal extent of the plate portion in the region of the center of the extent thereof in the width direction.

The connection portions 5 are in each case connected only at the two ends thereof, which are spaced apart from each other in the longitudinal direction 3, to the rear side 19 of the plate portion 1 opposite the front side 18. In the embodiment, in this instance there is formed at the rear side 19 of the plate portion 1 an elongate reinforcement rib 1a in the region of which the plate portion has a greater thickness and which extends in the longitudinal direction 3. The reinforcement rib 1a forms a stepped elevation at the rear side 19 of the plate portion 1. The two ends of the connection portion 5 are connected to the plate portion 1 in the region of the reinforcement rib 1a.

The reinforcement rib 1a could also be dispensed with so that the plate portion could also be constructed in a substantially planar manner at the rear side 19. The plate portion could then, if necessary, have an overall slightly larger thickness.

In the region between the two ends of the connection portions 5, they each have a spacing from the plate portion 1, whereby a slot 6 is formed in each case between the plate portion 1 and the respective connection portion 5.

In the embodiment, the plate portion 1 and the connection portion 5 are constructed in a materially integral manner with each other and form a metal base body of the valve plate. Instead, a construction comprising a plurality of portions and a materially engaging connection could also be provided. Thus, the connection portions 5 could, for example, be in the form of individual components which are welded with both ends thereof on the plate portion 1. A screwing of the two ends of the respective connection portion 5 to the plate portion 1 is also conceivable and possible.

In the region of the longitudinal center 20 of the plate portion 1, the two connection portions 5 may be formed with the two ends thereof directed toward each other in a materially integral manner as illustrated and formed with the plate portion 1.

Figure 4:
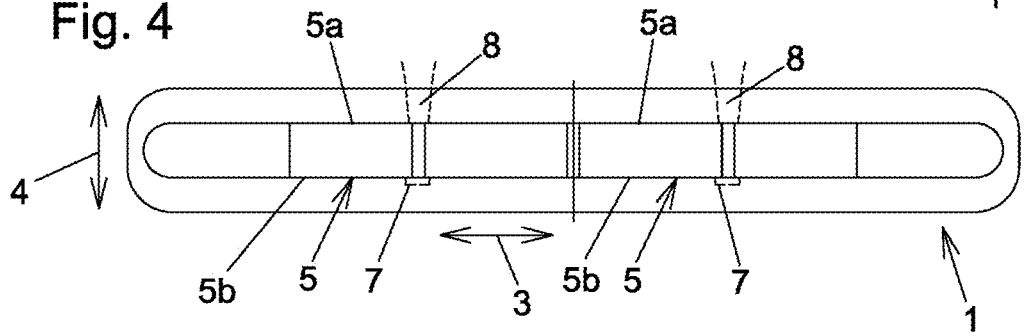
Figure 5:
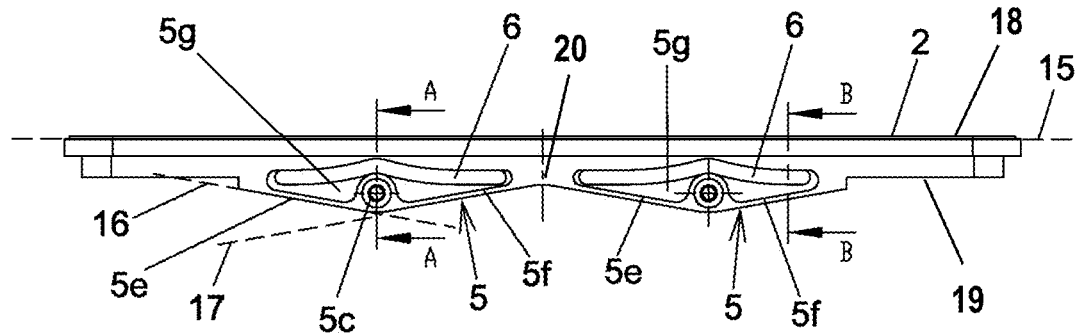
FIGS. 5 and 6 show side views of opposing longitudinally extending narrow sides of the valve plate.
Figure 6:
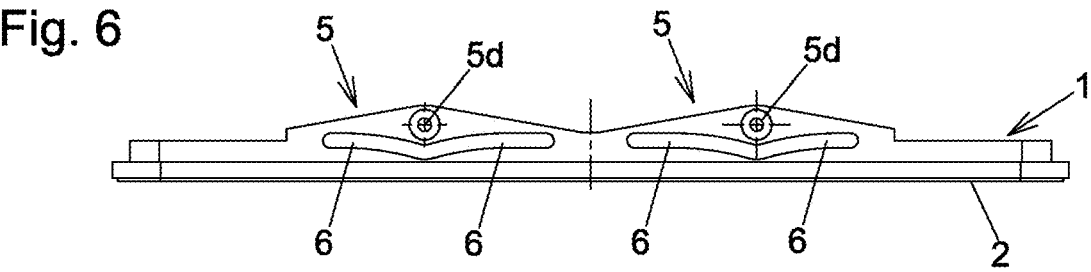
Figure 7:
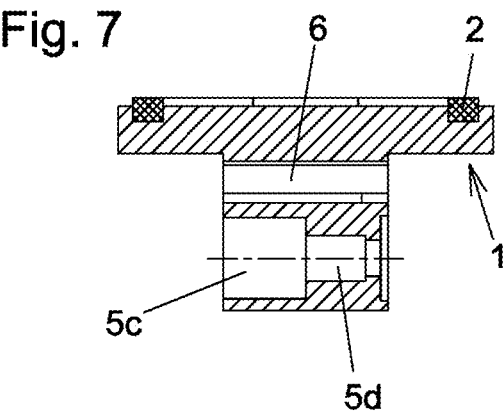
FIGS. 7 and 8 show sections along the lines A-A and B-B of FIG. 5.
Figure 8:
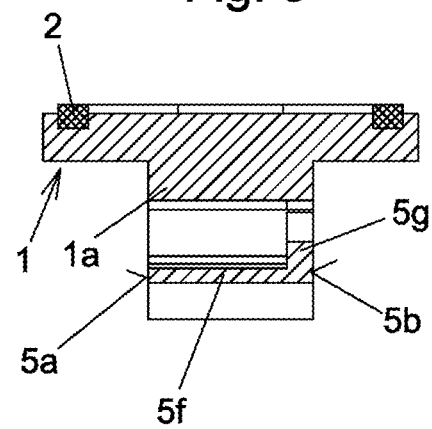

The connection portions 5 each have opposing first and second narrow sides 5a, 5b (=edge faces) which delimit the respective connection portion in the width direction 4. In particular, the narrow sides 5a, 5b are located at right-angles with respect to the plane 15 of the front side 19 of the valve plate. In a central region of the longitudinal extent of the first narrow side 5a, in the respective connection portion 5 a connection structure 5c is formed. This structure is used for connection to the end portion of a respective valve rod. The connection structure 5c is to this end orientated in the width direction 4. In the embodiment, the connection structure is in the form of a recess in the first narrow side 5a of the connection portion 5. The valve rod 8 is inserted into this recess with the end portion thereof. In FIG. 4, components of the valve rods 8 which are connected to the connection portion 5 are indicated with broken lines. In the base of the recess there is a hole 5d which continues up to the second narrow side 5b of the respective connection portion. Through this hole a securing screw 7 (also indicated in FIG. 4 with broken lines) can be screwed into a thread at the end of the respective valve rod. The valve rod 8 which is connected to the valve plate then protrudes at the first narrow side 5a from the connection portion 5, as can be seen in FIG. 4.

A respective connection portion 5 has two plate-like connection arms 5e, 5f which extend from the respective end of the connection portion 5 up to the longitudinal center of the connection portion and are connected to each other at that location by means of a thickened portion in which the connection structure 7 is formed, in the embodiment in a materially integral manner. The thickness of the connection arms 5e, 5f is consequently significantly smaller than the length and the width thereof.

The plate-like connection arms 5e, 5f are located in the embodiment in planes 16, 17. These planes 16, 17 form with the front side 19 of the plate portion 1 which is located in the plane 15 an angle of less than 20°, wherein the connection arms 5e, 5f starting from the respective end of the connection portion 5 move away from the front side 19 of the plate portion 1 (cf. FIG. 5) in the direction toward the longitudinal center of the connection portion. The planes 16, 17 are thus located obliquely relative to the plane 15. The angle between the respective plane 16, 17 and the plane 15 is preferably more than 5°.

Figure 9:
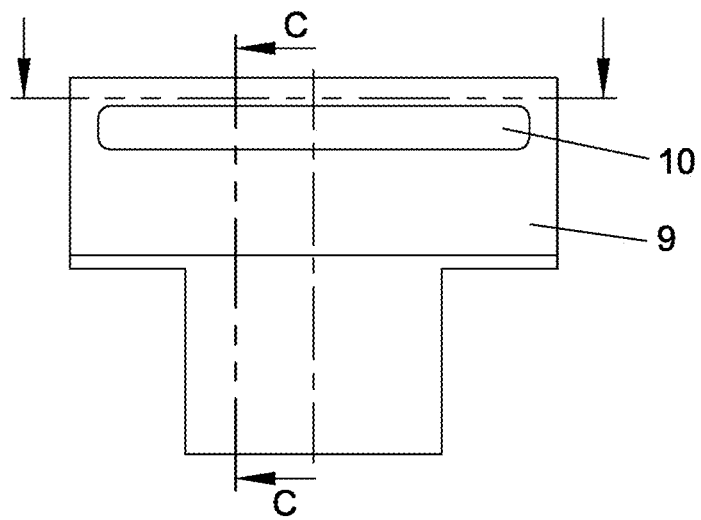
FIG. 9 shows a simplified illustration of a vacuum valve having a valve plate according to the invention according to the embodiment illustrated in FIGS. 1-8.
Figure 10:
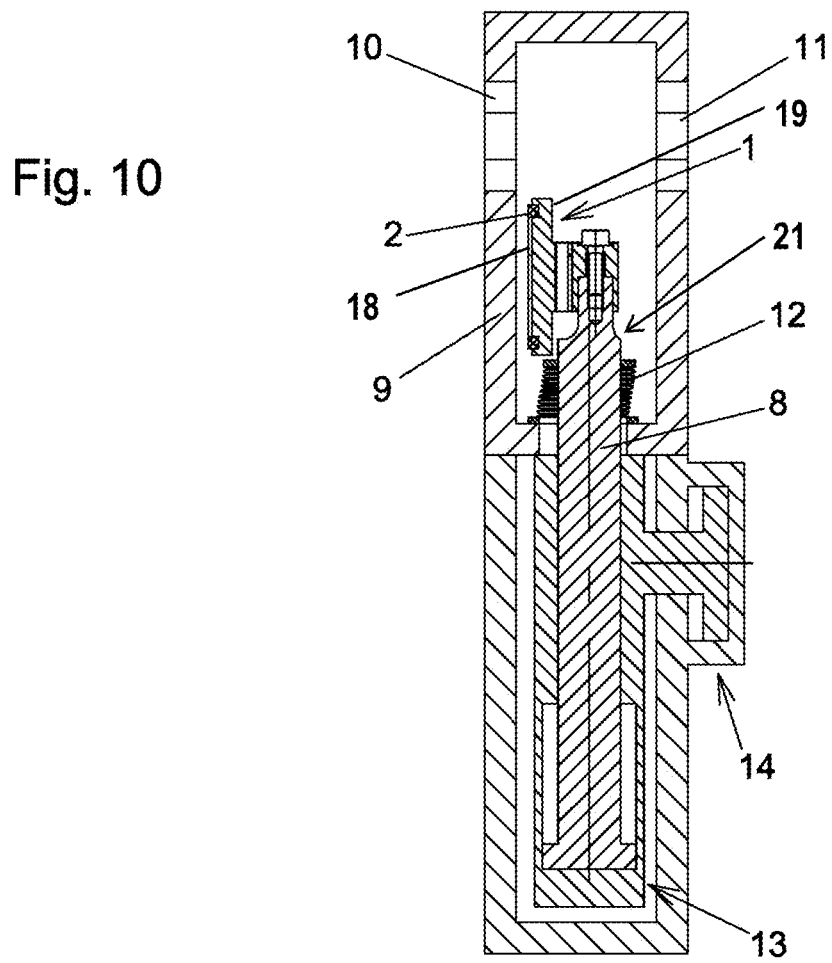
FIGS. 10 and 11 show sections along the lines C-C and D-D of FIG. 9 (in the open state of the vacuum valve)
Figure 11:
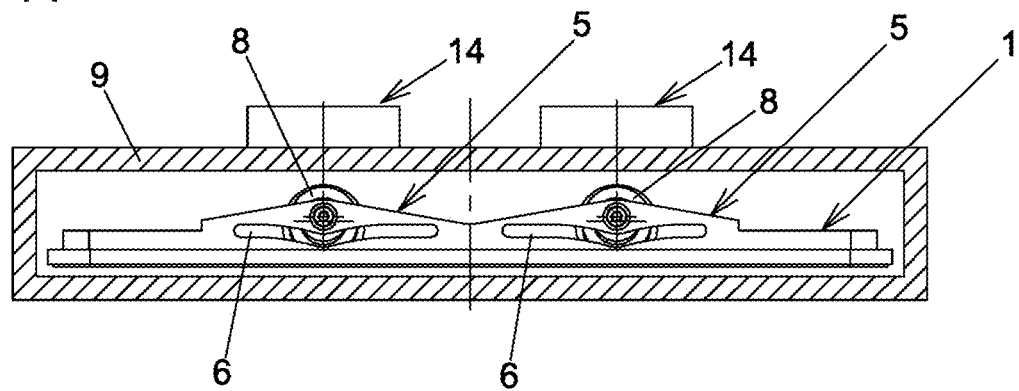
Figure 12:
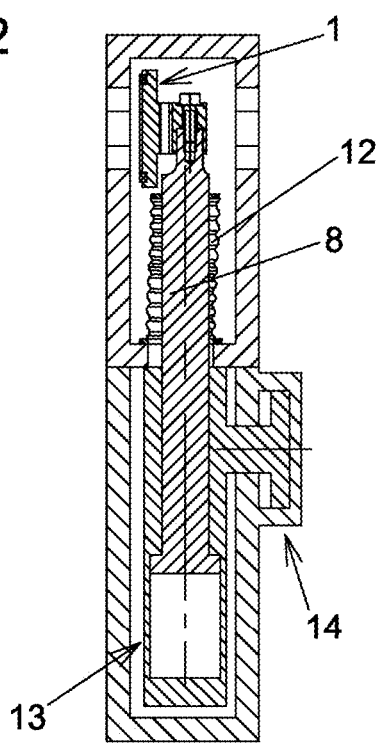
FIG. 12 show a section similar to FIG. 10 in the central position.
Figure 13:
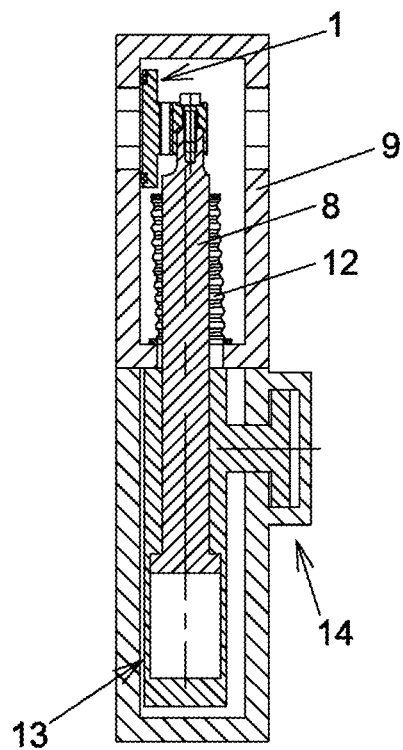
FIG. 13 shows a section similar to FIG. 10 in the closed state of the vacuum valve.

The connection portions 5 further have in each case a reinforcement web 5g which protrudes from the plate-like connection arms 5e, 5f in the direction toward the plate portion 1. The reinforcement web 5g is located in this instance in a region of the respective connection portion adjoining the second narrow side 5b. When viewed in cross section, cf. FIG. 8 and FIGS. 9 and 10, the reinforcement web 5g is located at right-angles with respect to the connection arms 5e, 5f. The connection portion 5 is consequently reinforced by the reinforcement web 5g in a region, adjacent to the second narrow side 5b, of the extent thereof in the width direction with respect to a region, adjacent to the first narrow side 5a, of the extent thereof in the width direction. The reinforcement is consequently located in the region of the half, which adjoins the second narrow side 5b, of the extent of the connection portion 5 in the width direction 4, in the embodiment directly at the second narrow side 5b.

The reinforcement web 5g is located in the embodiment in a plane which is located at right-angles with respect to the plane 15 in which the front side 19 of the plate portion 1 is located.

In modified embodiments, the reinforcement of the connection portion in a region which is adjacent to the second narrow side 5b could also be formed in another manner, in particular by means a larger thickness of the connection portion 5 in this region. For example, the connection arms 5e, 5f could have steps which extend in the longitudinal direction thereof, whereby the thickness of the connection arms 5e, 5f in a region adjacent to the second narrow side 5b is increased with respect to a region adjacent to the first narrow side 5a.

A simplified, partially schematic illustration of a vacuum valve which has a valve plate according to the invention can be seen in FIGS. 9 to 13. The vacuum valve has first and second valve rods 8 as a carrier apparatus 21 (indicated in FIG. 10) for carrying the valve plate. These rods are, as already described, connected to the connection structure 5c of the respective connection portion 5, wherein securing screws 7 are screwed into inner threads at the ends of the valve rods 8. The valve plate and portions of the valve rods 8 adjacent to the valve plate 8 are located in an inner space of a valve housing 9. In the open state of the vacuum valve, the valve plate releases a valve opening 10 and consequently a passage through the valve housing 9 between the valve opening 10 and an opposing opening 11, cf. FIG. 10. In the closed state of the vacuum valve, the valve opening 10 is closed by the valve plate and sealed, cf. FIG. 13.

The valve rods 8 are guided out of the inner space of the valve housing 9 in a sealed manner, for example, by means of a respective bellows 12. In order to open and close the vacuum valve, the valve rods 8 are moved by means of a valve drive which is located outside the vacuum region. To this end, schematic longitudinal drives 13 and transverse drives 14 are illustrated in the Figures. By means of the longitudinal drives 13, the valve rods 8 are displaced from an open state of the vacuum valve in the longitudinal direction thereof until the valve plate is opposite the valve opening 10 but is still raised therefrom, cf. FIG. 12. Starting from this intermediate position, the valve rods 8 and consequently also the valve plate are displaced by means of the transverse drives 14 in a direction at right-angles relative to the longitudinal axes of the valve rods, whereby the seal 2 of the valve plate is pressed on a valve seat which surrounds the valve opening 10 at the inner side of the valve housing 9. The valve seat is formed by a sealing face.

A vacuum valve which has a valve plate according to the invention could also be constructed in modified form. For example, in order to close the vacuum valve starting from the intermediate position, a pivoting of the valve rods 8 about a pivot axis which is located at right-angles with respect to the longitudinal axes of the valve rods could also be provided.

A common longitudinal drive 13 and/or a common transverse drive 14 for the valve rods could also be provided.

The connection structure and the end of the respective valve rod which cooperates therewith could also have a modified construction.

When the valve plate is pressed onto the valve seat, there is produced a degree of bending of the valve rods 8. The angular position of the valve plate with respect to the valve seat can be adapted in this instance by a bending of the connection portions 5. This bending of the connection portions 5 may in particular be a twisting (=torsion) of the connection portions. As a result of the reinforcement of the respective connection portion 5 in a region of the extent of the connection portion in the width direction 4, which region is adjacent to the second narrow side 5b, it may be possible in this instance for the pressing of the longitudinal member of the seal 2, which is located at the side of the valve plate remote from the valve drive, to be increased with respect to a construction of the connection portions without such a reinforcement. The pressing of this longitudinal member of the seal 2 located remote from the valve drive can thereby be adapted to the longitudinal member of the seal 2 located closer to the valve drive.

The reinforcement of the connection portions 5 of the valve plate is consequently located in the half of the extent of the connection portion 5 in the width direction 4, which half is remote from the valve drive.

A uniform pressing of the longitudinal members of the seal 2 and an at least substantially identically powerful pressing of the two narrow-side members of the seal 2 is achieved by the construction of the valve plate with the two connection portions which are connected at the two ends thereof to the plate portion and the cooperation of the two connection portions with the two valve rods.

LIST OF REFERENCE NUMERALS

1 Plate portion
1a Reinforcement rib
2 Seal
3 Longitudinal direction
4 Width direction
5 Connection portion
5a First narrow side
5b Second narrow side
5c Connection structure
5d Hole
5e Connection arm
5f Connection arm
5g Reinforcement web
6 Slot
7 Securing screw
8 Valve rod
9 Valve housing
Valve opening
11 Opening
12 Bellows
13 Longitudinal drive
14 Transverse drive
15 Plane
16 Plane
17 Plane
18 Front side of the plate portion
19 Rear side of the plate portion 20 Longitudinal center of the plate portion
21 Carrier apparatus

The invention claimed is:

1. A valve plate, comprising:
a plate portion having a front side on which a seal made of an elastomer material is fitted, the plate portion has in a longitudinal direction a longitudinal extent which is greater than a width extent in a width direction which is located at right-angles relative to the longitudinal direction;
a connection apparatus arranged at a rear side of the plate portion, opposite the front side, for connecting the valve plate to a carrier apparatus of a vacuum valve;
the connection apparatus has first and second elongate connection portions, the first connection portion is located at one side of a longitudinal center and the second connection portion is located at an other side of the longitudinal center of the plate portion;
the first and second elongate connection portions are each connected to the plate portion with two ends of each of the first and second connection portions which are spaced apart in the longitudinal direction;
the first and second connection portions are in each case spaced apart from the plate portion in a region between the two ends of each of the first and second elongate connection portions with a respective slot being formed between the plate portion and the respective first or second connection portion; and
the connection portions in a central region of a longitudinal extent thereof each have a connection structure for connection to an end portion of a respective valve rod of the carrier apparatus of the vacuum valve;
wherein each of said first and second connection portions has first and second plate-shaped connection arms which extend from the respective ends of the respective connection portion as far as a central region of the longitudinal extent of the connection portion; and
the first and second plate-shaped connection arms are located in planes which enclose with the front side of the plate portion, which is located in a plane, an angle of less than 20°, and said planes starting from the respective ends of the respective connection portion move away from the front side of the plate portion in a direction toward the longitudinal center of the respective connection portion.

2. The valve plate according to claim 1, wherein the plate-shaped connection arms are connected to each other in the central region of the longitudinal extent of the respective connection portion via a thickened portion in which the connection structure is formed.

3. The valve plate according to claim 1, further comprising a connection structure with a respective recess in each of the first and second connection portions for receiving an end portion of the valve rod.

4. The valve plate according to claim 1, wherein the plate portion includes a reinforcement rib at the rear side, the reinforcement rib extends in the longitudinal direction and connects the two ends of the respective first and second connection portions.

5. The valve plate according to claim 1, wherein a connection structure is formed in a region of a first narrow side of each said respective one of the first and second connection portions and each of the respective first and second connection portions is reinforced in a region of the extent thereof in the width direction, said region adjoins an opposing second narrow side of the respective connection portion, with respect to a region of the extent thereof in the width direction, which region adjoins the first narrow side.

6. The valve plate according to claim 5, wherein a reinforcement web protrudes in a direction toward the plate portion of the valve plate from each of said respective first and second connection portions in a region of the extent thereof in the width direction, which region adjoins the second narrow side thereof.

7. A vacuum valve comprising: the valve plate according to claim 1, a first and a second valve rod connected to the valve plate, said first and second valve rods being adjustable by a valve drive in order to open and close the vacuum valve.

8. A valve plate, comprising:
a plate portion having a front side on which a seal made of an elastomer material is fitted, the plate portion has in a longitudinal direction a longitudinal extent which is greater than a width extent in a width direction which is located at right-angles relative to the longitudinal direction;
a connection apparatus arranged at a rear side of the plate portion, opposite the front side, for connecting the valve plate to a carrier apparatus of a vacuum valve;
the connection apparatus has first and second elongate connection portions, the first connection portion is located at one side of a longitudinal center and the second connection portion is located at an other side of the longitudinal center of the plate portion;
the first and second elongate connection portions are each connected to the plate portion with two ends of each of the first and second connection portions which are spaced apart in the longitudinal direction;
the first and second connection portions are in each case spaced apart from the plate portion in a region between the two ends of each of the first and second connection portions with a respective slot being formed between the plate portion and the respective first or second connection portion;
the first and second connection portions in a central region of a longitudinal extent thereof each have a connection structure for connection to an end portion of a respective valve rod of the carrier apparatus of the vacuum valve; and
the plate portion includes a reinforcement rib at the rear side, the reinforcement rib extends in the longitudinal direction and connects the two ends of the respective first and second connection portions.

9. A vacuum valve comprising: the valve plate according to claim 8, a first and a second valve rod connected to the valve plate, said first and second valve rods being adjustable by a valve drive in order to open and close the vacuum valve.

10. A valve plate, comprising:
a plate portion having a front side on which a seal made of an elastomer material is fitted, the plate portion has in a longitudinal direction a longitudinal extent which is greater than a width extent in a width direction which is located at right-angles relative to the longitudinal direction;
a connection apparatus arranged at a rear side of the plate portion, opposite the front side, for connecting the valve plate to a carrier apparatus of a vacuum valve;
the connection apparatus has first and second elongate connection portions, the first connection portion is located at one side of a longitudinal center and the second connection portion is located at an other side of the longitudinal center of the plate portion;
the first and second elongate connection portions are each connected to the plate portion with two ends of each of the first and second connection portions which are spaced apart in the longitudinal direction;

the first and second connection portions are in each case spaced apart from the plate portion in a region between the two ends of each of the first and second connection portions with a respective slot being formed between the plate portion and the respective first or second connection portion;

the connection portions in a central region of a longitudinal extent thereof each have a connection structure for connection to an end portion of a respective valve rod of the carrier apparatus of the vacuum valve; and a connection structure formed in a region of a first narrow side of each said respective one of the first and second connection portions and each of the respective first and second connection portions is reinforced in a region of the extent thereof in the width direction, said region adjoins an opposing second narrow side of the respective connection portion, with respect to a region of the extent thereof in the width direction, which region adjoins the first narrow side.

11. The valve plate according to claim 10, wherein a reinforcement web protrudes in a direction toward the plate portion of the valve plate from each of said respective first and second connection portions in a region of the extent thereof in the width direction, which region adjoins the second narrow side thereof.

12. A vacuum valve comprising: the valve plate according to claim 10, a first and a second valve rod connected to the valve plate, said first and second valve rods being adjustable by a valve drive in order to open and close the vacuum valve.

* * * * *